US010530644B2

(12) United States Patent
Amend et al.

(10) Patent No.: US 10,530,644 B2
(45) Date of Patent: Jan. 7, 2020

(54) TECHNIQUES FOR ESTABLISHING A COMMUNICATION CONNECTION BETWEEN TWO NETWORK ENTITIES VIA DIFFERENT NETWORK FLOWS

(71) Applicant: Deutsche Telekom AG, Bonn (DE)

(72) Inventors: Markus Amend, Nidda (DE); Eckard Bogenfeld, Carlsberg (DE); Andreas Philipp Matz, Hungen-Bellersheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 189 days.

(21) Appl. No.: 15/660,984

(22) Filed: Jul. 27, 2017

(65) Prior Publication Data

US 2018/0034691 A1    Feb. 1, 2018

(30) Foreign Application Priority Data

Jul. 29, 2016  (EP) .................................... 16181902

(51) Int. Cl.
*H04L 12/00*     (2006.01)
*H04L 12/24*     (2006.01)
*H04L 12/801*    (2013.01)
*H04W 74/00*     (2009.01)

(52) U.S. Cl.
CPC .......... *H04L 41/0806* (2013.01); *H04L 47/15* (2013.01); *H04W 74/00* (2013.01)

(58) Field of Classification Search
CPC ..... H04L 41/0806; H04L 47/15; H04L 45/24; H04L 45/16; H04L 12/24; H04L 12/801; H04W 40/02

USPC ......... 709/227, 228, 249; 370/329, 230–232, 370/235, 252
See application file for complete search history.

(56) References Cited

U.S. PATENT DOCUMENTS 6,240,449 B1 * 5/2001 Nadeau ............... H04M 7/1225
                                              709/223
7,359,325 B1 * 4/2008 Lewis ................. H04L 41/0896
                                              370/230.1
(Continued)

FOREIGN PATENT DOCUMENTS

EP    1981212 A1 * 10/2008  ............ H04W 28/22
EP    2854357 A1    4/2015
(Continued)

*Primary Examiner* — Frantz Coby
(74) *Attorney, Agent, or Firm* — Leydig, Voit & Mayer, Ltd.

(57) ABSTRACT

A method for establishing a communication connection between a first network entity and a second network entity via at least two different network flows includes: transmitting a first request, by the first network entity, directed to the second network entity via a first network flow; transmitting at least one second request, by the first network entity, directed to the second network entity via at least one second network flow, wherein the at least one second request is transmitted by the first network entity before the first network entity receives a reply to the first request from the second network entity; and establishing the communication connection between the first network entity and the second network entity based on at least one of the first request or the at least one second request.

14 Claims, 7 Drawing Sheets

(56) References Cited

U.S. PATENT DOCUMENTS

| | | | | |
|---|---|---|---|---|
| 7,623,530 B2* | 11/2009 | Hurtta | H04L 47/15 | 370/401 |
| 8,059,533 B2* | 11/2011 | Andreasen | H04L 41/0893 | 370/230 |
| 8,077,681 B2* | 12/2011 | Ahmavaara | H04L 12/2856 | 370/338 |
| 8,144,587 B2* | 3/2012 | Heinz | H04L 45/00 | 370/235 |
| 8,274,891 B2* | 9/2012 | Averi | H04L 45/00 | 370/232 |
| 8,331,234 B1* | 12/2012 | Newton | H04L 43/026 | 370/231 |
| 2006/0193295 A1* | 8/2006 | White | H04L 12/5692 | 370/336 |
| 2009/0080338 A1* | 3/2009 | Parker | H04L 41/00 | 370/250 |
| 2009/0154348 A1* | 6/2009 | Newman | H04L 43/18 | 370/230 |
| 2011/0096676 A1* | 4/2011 | Krzanowski | H04L 12/4641 | 370/252 |
| 2012/0002667 A1* | 1/2012 | Zhao | H04L 47/10 | 370/355 |
| 2012/0099601 A1* | 4/2012 | Haddad | H04L 29/12405 | 370/401 |
| 2013/0229976 A1* | 9/2013 | Srinivasan | H04W 36/18 | 370/315 |
| 2013/0322347 A1* | 12/2013 | Alex | H04W 74/00 | 370/329 |
| 2015/0256555 A1* | 9/2015 | Choi | H04L 63/1441 | 726/23 |
| 2016/0094467 A1* | 3/2016 | Hong | H04L 47/2441 | 370/235 |
| 2017/0366445 A1* | 12/2017 | Nemirovsky | H04L 45/12 | |
| 2018/0287859 A1* | 10/2018 | Desigowda | H04L 41/0695 | |

FOREIGN PATENT DOCUMENTS

| | | |
|---|---|---|
| EP | 2882148 A1 | 6/2015 |
| WO | WO 2015171023 A1 | 11/2015 |

* cited by examiner

TECHNIQUES FOR ESTABLISHING A COMMUNICATION CONNECTION BETWEEN TWO NETWORK ENTITIES VIA DIFFERENT NETWORK FLOWS

CROSS-REFERENCE TO RELATED APPLICATIONS

Priority is claimed to European Patent Application No. EP 16181902.4, filed on Jul. 29, 2016, the entire disclosure of which is hereby incorporated by reference herein.

FIELD

The present disclosure relates to techniques for establishing a communication connection between two network entities, in particular between a first host computer and a second host computer, via different network flows. The disclosure further relates to methods and devices for robust connection establishment.

BACKGROUND

Figure 1:
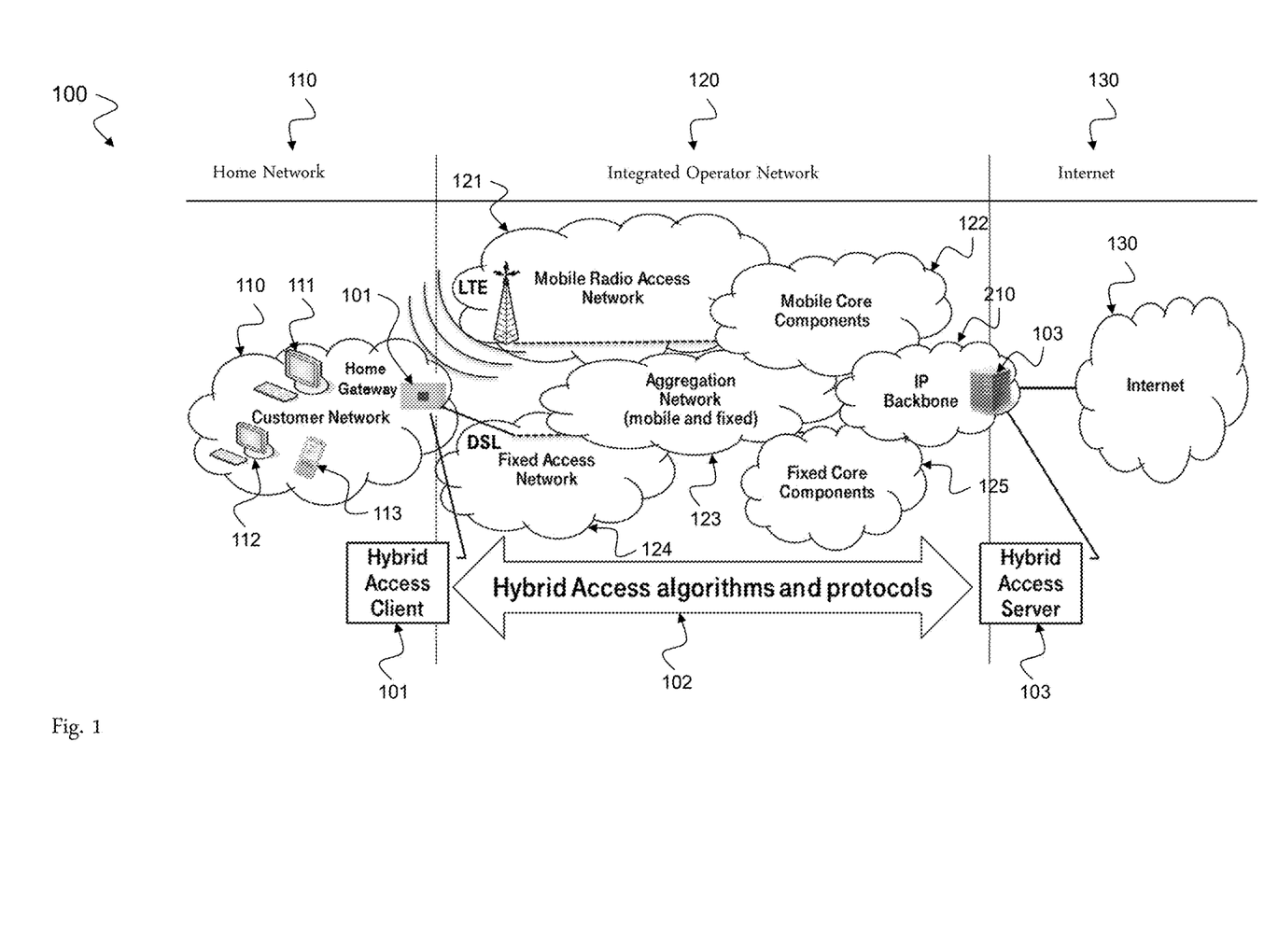
FIG. 1 shows a block diagram illustrating the reference topology for hybrid access (HA) 100.
Figure 2:
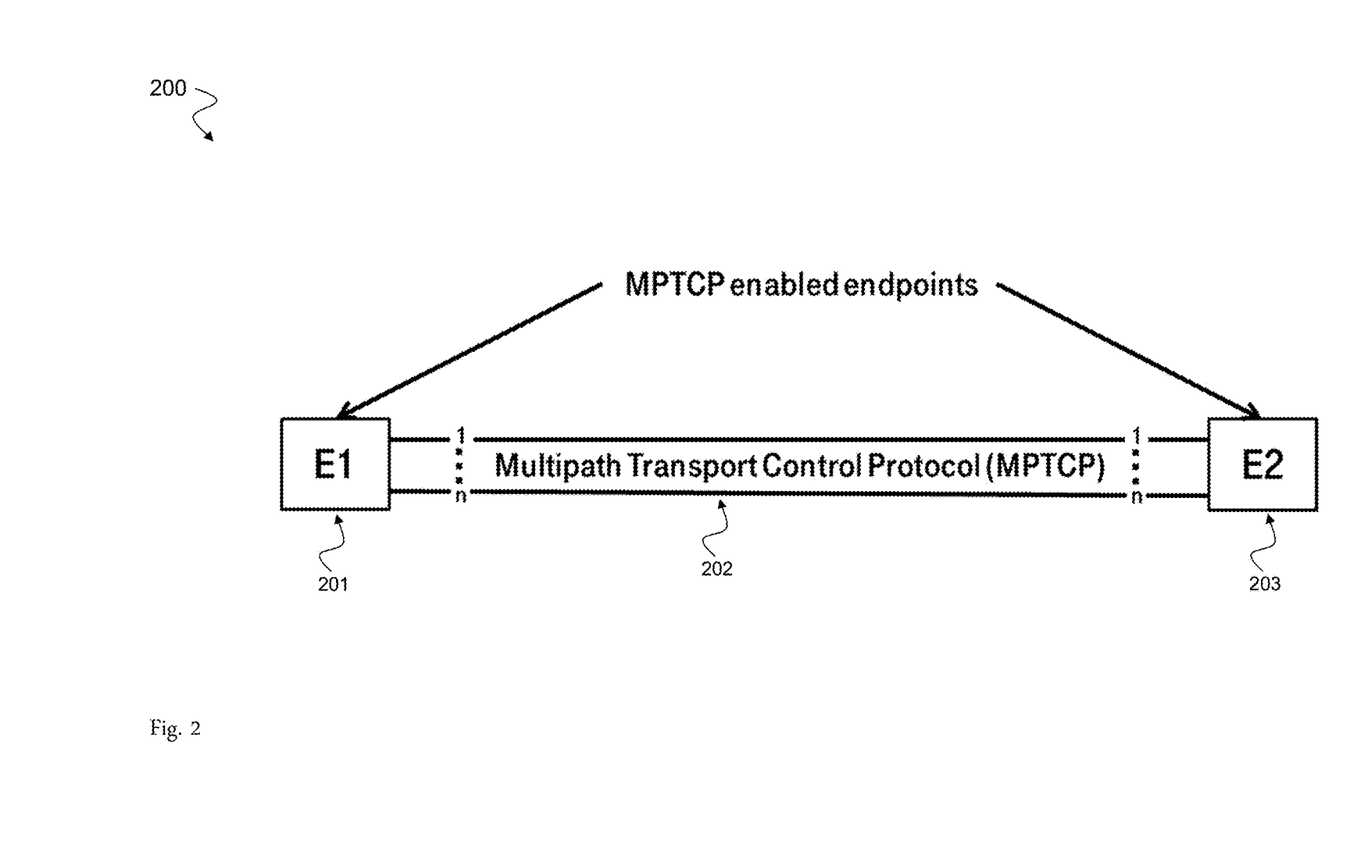
FIG. 2 shows a block diagram illustrating the general architecture for Multipath Transport Control Protocol (MPTCP) 200.

Hybrid Access (HA) combines at least two different network links with the same or different network technology, for example it combines the access over the fixed network 124 with the access over the cellular network 121. FIG. 1 shows a typical scenario for HA but can also be implemented as an over the top (OTT) solution. The HA client 101 has at least two access interfaces, one for example for Digital Subscriber Line (DSL) access 124 and another one for example for access to the Long Term Evolution (LTE) network 121. The considerations on the HA algorithms 102 are focused on a distributed client-server solution with client functionality in the residential gateway 101 and server functionality (HA Server 103) in a data center at the network of the operator 210 or in the public Internet 130. The Multipath Transmission Control Protocol (MPTCP) according to RFC 6824: A. Ford, C. Raiciu, M. Handley, and O. Bonaventure, "TCP Extensions for Multipath Operation with Multiple Addresses," RFC, no. 6824, January 2013" can be applied for HA. MPTCP is a new proposed standard for a transport layer protocol as an extension to the regular Transmission Control Protocol (TCP). MPTCP, as depicted in FIG. 2 depicting two endpoints E1, 201 and E2, 203 connected by MPTCP 202, enhances network performance, especially if the available throughput on one interface is relatively lower than the application's demand and there is the possibility to use multiple (n) interfaces to maximize the overall output.

Since the Linux kernel implementation of the MPTCP, resource bundling on multihomed devices has come to be one step closer to ubiquitous. However, bundling HA networks with MPTCP faces a challenge from connectivity issues, should the primary chosen route fail to establish a connection to the desired endpoint. MPTCP by default relies on the network layer's routing functionality to make sure that it can build an initial subflow, to be in a position to exploit multiple routes to the same destination.

MPTCP enables making use of multiple interfaces and/or paths (IP addresses and port numbers) for a single connection. By default/design a TCP connection is bound by a four tuple of IP addresses and port numbers, implying that no more than one pair of IP addresses can be used at a time. When an application desires to communicate with a remote host using TCP as a transport layer protocol, it creates a socket, which is identified by a pair of IP addresses and a pair of port numbers. These pairs are unique that addition of any pairs to this communication is impossible. To overcome this limitation MPTCP was developed to allow TCP make use of multiple pairs of IP addresses and/or port numbers for a single communication, while keeping the application layer abstraction of single pairs.

This abstraction of single pair IP address and port numbers is achieved with the concept of initiating and establishing a first main TCP flow. This main flow is used as the single point of exchange between the application and TCP and enables data communication (switch connection in "established" mode). That is, MPTCP has added an extra layer of abstraction where it can aggregate different subflows as a single one, as if the data received from all subflows was received via the main flow only (from the application's point of view). This concept requires that this flow be the first to be created while establishing additional connections. The main flow is referred to as "primary subflow", and any further addition of flows (called additional/subsequent subflows) to this connection should follow only after a successful establishment of this primary subflow.

To start a connection MPTCP sends a TCP like SYN message that has an option to ask/offer MPTCP capability, called MP_CAPABLE. The receiver on the other hand has the option either to reply with an MP_CAPABLE SYN/ACK packet and form an MPTCP enabled connection or with a regular TCP SYN/ACK message telling the sender to fall back to a regular TCP connection. In the former scenario, the two connecting parties will exchange key strings from which a token will be generated to enable further flow establishment and securely join the pool of MPTCP subflows belonging to a single connection.

The phase of connection establishment relies on the functionality of its path manager which in turn relies on the network layer routing module. By design Linux' routing subsystem provides list of available routes to the kernel modules that require it. Moreover, under normal circumstances, a Linux machine can have only one default route at a time, except that load balancing functionality is desired. This implies that, if a route designated as default becomes inaccessible, then the routing functionality will not be able to serve the connection request coming from the application layer destined to unknown routes. Even in the case of multipath routing, as soon as a route configured as one of the default gateways dies, the entire multipath routing rule is deleted leaving no default route at all. This problem could be solved only if the interface in question is put down, so that device status change messages trigger the routing module to remove it from the default route and there is an independent process that promotes an alternative interface as default route. There are various ways of achieving this goal, but none is immune against introducing delay while establishing a connection and consuming extra resources.

This problem is further exacerbated if the connection initiating multihomed device is connected to a router that has no connection to the other end. That is, if the network interface connected to such a router is set as default route, MPTCP will not get a timely feedback that desired host is not reachable on this route and should resort to alternative paths. Rather it will wait until RTO expires and gives up on connection attempts. This is a dead end scenario that could be experienced by mobile devices having both cellular and wireless connectivity. On such devices, by default, wireless networks (WLAN) are set as default routes, whenever available for cost reasons.

Network vendors providing hybrid access solution could experience even a worse situation if their resource bundling solution at home gateway uses MPTCP with a proxy solution. That is, when a single homed client initiates a connection to the internet, the home gateway will intercept that connection, letting the client believe it is connected to its desired destination. But since the home gateway's default route has lost connection to the internet, the home gateway will never be able to initiate a second subflow except there is a mechanism to correct this setback.

A second worse scenario for network vendors providing hybrid access solution is when a multihomed client connects to such a gateway (putting aside the question whether such a client could ever be able to exploit its multiple interfaces at the same time in such constellation). In this case, even if the client has a second network interface, which is capable of accessing the internet, it will never be able to reach its connection partner as it will have a primary subflow bound to the home gateway only. Detecting and correcting such a failure is even more challenging than the former scenario.

SUMMARY

In an exemplary embodiment, the present invention provides a method for establishing a communication connection between a first network entity and a second network entity via at least two different network flows. The method includes: transmitting a first request, by the first network entity, directed to the second network entity via a first network flow; transmitting at least one second request, by the first network entity, directed to the second network entity via at least one second network flow, wherein the at least one second request is transmitted by the first network entity before the first network entity receives a reply to the first request from the second network entity; and establishing the communication connection between the first network entity and the second network entity based on at least one of the first request or the at least one second request.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION OF EMBODIMENTS

Exemplary embodiments of the invention to provide a solution for the above described problems, and provide a concept for a robust connection establishment in the hybrid access scenario as shown in FIG. 1.

Exemplary embodiments of the invention improve the MPTCP's connection setup procedure in order to provide a solution how to implement MPTCP Robust Establishment (RobE). The focus, as the name intends, is mainly on the robust part, without affecting application layer. That means as long as at least one working connection path to the opposite endpoint is available, MPTCP can exploit and establish a connection. In addition to the connection establishment from multipoint-to-point as shown and described below with respect to FIG. 3, exemplary embodiments of the invention are also valid for multipoint to multipoint and point to multipoint.

In order to describe the invention in detail, the following terms, abbreviations and notations will be used:
ACK Acknowledge
DSL Digital Subscriber Line
HA Hybrid Access
HAAP Hybrid Access Aggregation Point
HGW Home Gateway
Int Interface
LTE Long Term Evolution
MAC Media Access Control
MP Multipath
MPTCP Multipath TCP
RobE Robust Establishment
RTO Retransmission Time Out
RTT Round Trip Time
RST Reset
SSN Subflow Sequence Number
SYN Synchronize
TCP Transport Control Protocol
VPN Virtual Private Network Methods and devices according to the disclosure provide a solution to improve the MPTCP protocol. The MPTCP protocol is an extension of the transmission control protocol (TCP) to incorporate multiple network paths. TCP as defined by RFC 793 and RFC 1323 is a core protocol of the Internet protocol suite, commonly referred to as TCP/IP. TCP provides reliable, ordered, and error-checked delivery of a stream of octets between applications running on hosts communicating over an IP network. To establish a connection, TCP uses a three-way handshake. Before a client attempts to connect with a server, the server must first bind to and listen at a port to open it up for connections. To establish a connection, the three-way handshake occurs:
SYN: The active open is performed by the client sending a SYN to the server. The client sets the segment's sequence number to a random value A. SYN-ACK: In response, the server replies with a SYN-ACK. The acknowledgment number is set to one more than the received sequence number, i.e. A+1, and the sequence number that the server chooses for the packet is another random number, B. ACK: Finally, the client sends an ACK back to the server. The sequence number is set to the received acknowledgement value, i.e. A+1, and the acknowledgement number is set to one more than the received sequence number i.e. B+1. At this point, both the client and server have received an acknowledgment of the connection. The steps 1, 2 establish the connection parameter (sequence number) for one direction and it is acknowledged. The steps 2, 3 establish the connection parameter (sequence number) for the other direction and it is acknowledged. With these, a full-duplex communication is established.

Figure 3:
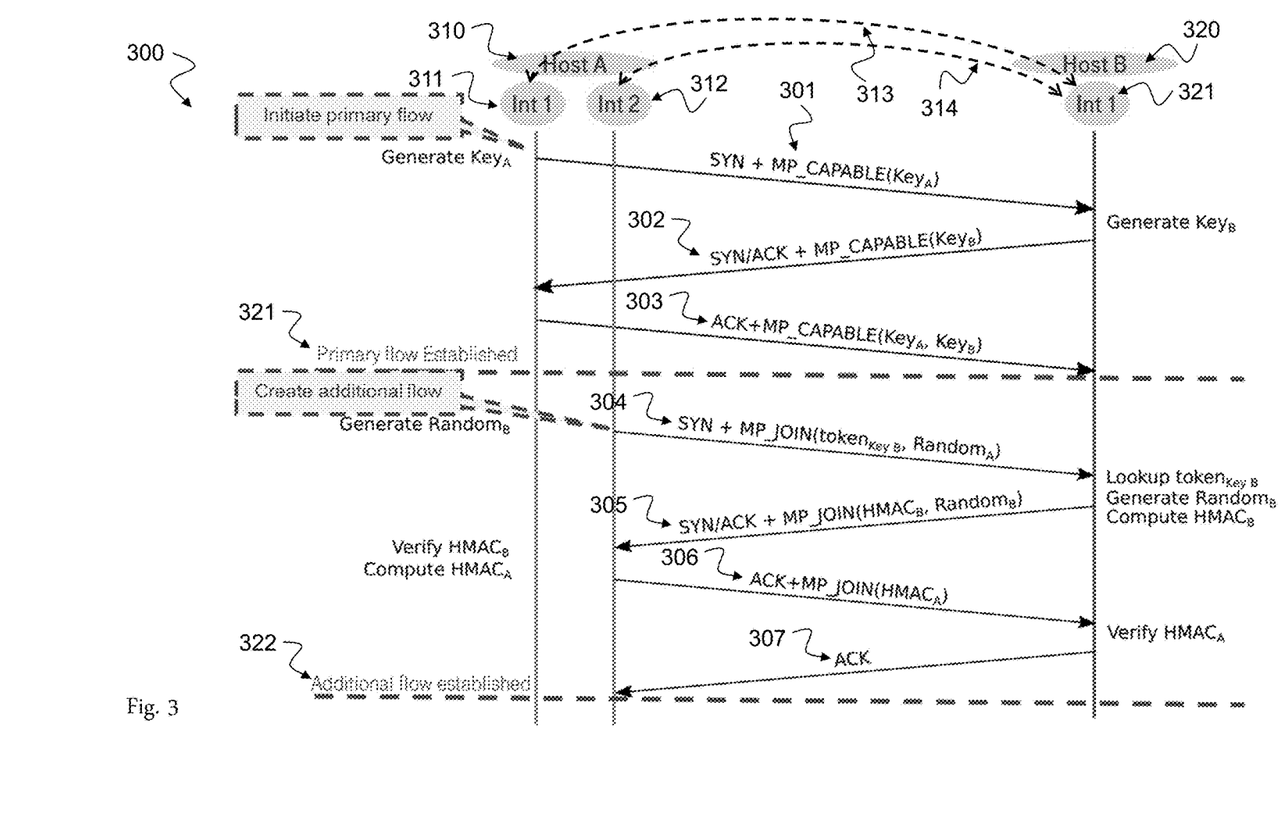
FIG. 3 shows a message sequence diagram illustrating MPTCP connection establishment 300 as defined by the RFC.

FIG. 3 shows a sequence diagram illustrating a simplified MPTCP connection establishment 300, where Host A 310 has two active network interfaces Int 1, 311 and Int 2, 312 (interface Int1, 311 being the default route), while Host B 320 has only one interface Int 1, 321. Both, Host A and Host B, are MPTCP capable, understand thereby the "MP_CAPABLE" TCP option and are able to negotiate a full MPTCP connection establishment. As can be seen Host A 310 initiates the connection 313 (primary flow) from its network interface Int$1_A$ 311 and sends its connection request 301 to Host B's 320 network interface Int$1_B$ 321. Host B 320 sends a reply 302 to Host A 310 and Host A sends an acknowledgement 303 to Host B 320. Once the primary connection 313 is established 321 and a token is generated, Host A 310 sends a second connection request 304 with an MP_JOIN option to Host B 320. This process can be initiated only from Host A 310, as only it knows the existence of a second interface and address of Host B's 320 interface (unless of course it has informed Host B 320 of its second interface with ADD_ADDR message). This join request 304 is verified by the token that is generated in the earlier connection establishment phase. Host B 320 sends a reply 305 to Host A 310, Host A sends an acknowledgement 306 to Host B 320 and Host B 320 sends an acknowledgement 307 to Host A 310. Once the secondary connection 314 is established 322 subsequent subflow establishments follow same procedure and use same token, should there be more network interfaces or paths available for communication. Note that connection establishment can also be initiated in reverse direction, i.e. from Host B 320 to Host A 310 (not shown in FIG. 3). In the following, establishing of network flows is described. Note that in this disclosure, an establishment of a network flow is an equivalent description for an establishment of a network path.

Methods and devices according to the disclosure describe connection establishment between different network entities. A network entity may be a computer host, a computer server or some network node. A network entity may be a hardware unit, e.g. a computer server, a network node or device, a PC, a tablet, a smartphone, a router, a gateway or a whole computer network. A network entity may be a software unit, e.g. an application program or software module on a PC, tablet, smartphone or any other hardware device.

According to a first aspect, the invention relates to a method for establishing a communication connection between a first network entity and a second network entity via at least two different network paths, the method comprising: transmitting a first request, by the first network entity, directed to the second network entity via a first network path, transmitting at least one second request, by the first network entity, directed to the second network entity via at least one second network path, wherein the at least one second request is transmitted by the first network entity before the first network entity receives a reply to the first request from the second network entity; and establishing the communication connection between the first network entity and the second network entity based on at least one of the first request or the at least one second request.

Such a messaging provides the advantage that transmitting the one or more second requests can be performed without waiting for a reply to the first request. Thus, in case that the first request gets lost or a failure with respect to the first request occurs, the method can transmit one or more second requests which cause the receiver to send replies. Hence, communication establishment can be guaranteed even in such scenarios where the first request is not replied. This guarantees a safe connection establishment over at least one network path of a plurality of available network paths.

In an implementation form, the method comprises: transmitting the first request comprising information indicating the first network path/flow to be configured as primary network path/flow; and transmitting the at least one second request comprising information indicating the at least one second network path/flow also to be configured as primary network path/flow.

This provides the advantage that a primary, i.e. preferred network path/flow can be established over one of the first or multiple second network paths because the first network entity is not required to wait for a reply to the first request.

In an implementation form of the method, the at least two different network paths/flows are configured to couple the first network entity with the second network entity via a multipoint-to-point connection, a multipoint-to-multipoint connection or a point-to-multipoint connection.

This provides the advantage that this new method can be applied to a variety of network scenarios such as multipoint-to-point, multipoint-to-multipoint and point-to-multipoint connection.

In an implementation form of the method, transmitting the first request is initiated approximately at the same time as transmitting the at least one second request.

This provides the advantage that both requests can be transmitted together which facilitates the implementation. For example, both requests can be written to the transmit buffer and can be processed at the same time.

Figure 4:
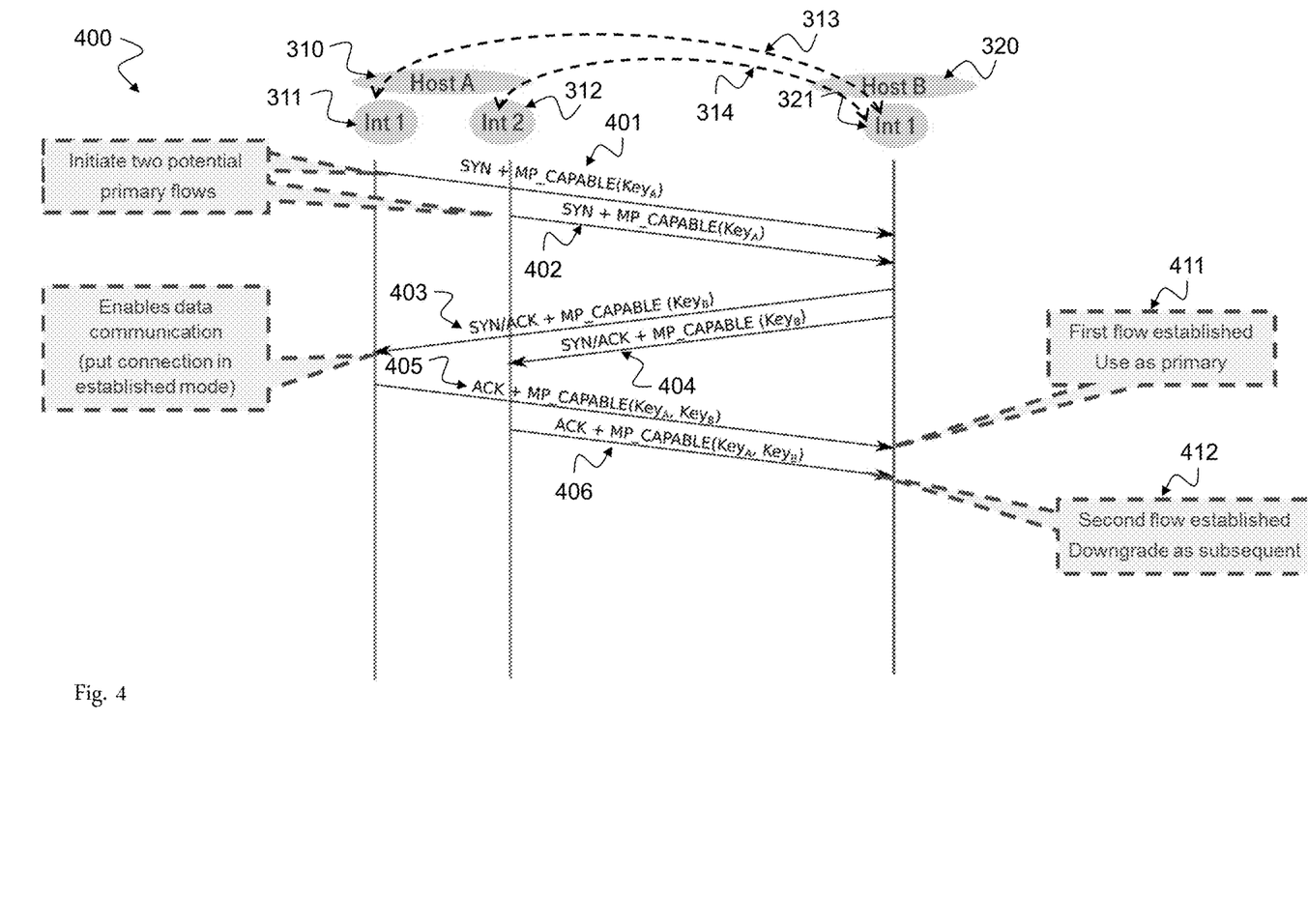
FIG. 4 shows a message sequence diagram illustrating a method 400 for establishing a communication connection between a first network entity and a second network entity via two different network paths/flows according to a first implementation form.

In an implementation form, the method comprises: enabling data communication, by the first network entity 310, responsive to a decision based on the reception of the reply 403 to the first request 401 from the second network entity 320 and/or a reception of at least one reply 404 to the at least one second request 402 from the second network entity (Host B) 320; transmitting a first acknowledgement 405, by the first network entity, directed to the second network entity via the first network path/flow; transmitting at least one second acknowledgement 406, by the first network entity, directed to the second network entity via the at least one second network path/flow; and configuring, by the second network entity, the network path/flow of the at least two different network paths/flows via which the respective acknowledgement from the first network entity is first received by the second network entity, as primary network path/flow.

This provides the advantage that connection establishment can be accelerated because the fastest connection, i.e. the connection with minimum delay can be used for connection establishment.

In an implementation form, the method comprises: configuring, by the second network entity, the at least one other network path/flow of the at least two different network paths/flows via which the respective acknowledgement from the first network entity is received thereafter by the second network entity, as at least one secondary network path/flow.

This provides the advantage that secondary network paths or subsequent flows can additionally be established. Such secondary networks paths/flows can serve as redundant network paths/flows or can be used for network path/flow aggregation to improve data throughput.

In an implementation form, the method comprises: configuring the primary network path as initial flow according to the multipath transport control protocol; and configuring the at least one secondary network path as subsequent flow according to the MPTCP protocol.

This provides the advantage that established network paths are compliant to the MPTCP protocol.

In an implementation form, the method comprises: transmitting at least one network path/flow reset signal, by the second network entity, directed to the first network entity via the at least one other network path/flow of the at least two different network paths/flows responsive to the respective acknowledgement received at first.

This provides the advantage that only one network path/flow is established as primary network path/flow which is the network path/flow on which the three-way handshake, i.e. request, reply, acknowledgement, is finished at first. All other network paths/flows, on which three-way handshakes are performed, are then established as secondary network paths/flows.

In an implementation form, the method comprises: transmitting at least one further second request, by the first network entity, directed to the second network entity via the at least one other network path/flow responsive to a reception of the at least one network path/flow reset signal, by the first network entity.

This provides the advantage that a network failure, in which case the first request gets lost or a failure with respect to the first request occurs, has no negative influence on connection establishment. In this case, the network path/flow reset signal indicates that the corresponding network path/flow in which the failure occurs should be reset. Then another network path/flow can be followed to establish connection setup.

In an implementation form, the method comprises: transmitting the at least one further second request comprising information indicating the at least one other network path/flow to be configured as at least one secondary network path/flow. This may correspond to MPTCP using additional flow with MP_JOIN.

This provides the advantage that other secondary network path/flow connections can be established, for example as redundant connections to improve network safety or as aggregate connections to improve data throughput. Hence connection setup is robust and safe.

In an implementation form, the method comprises: starting a timer, by the first network entity, responsive to transmitting the first request; and transmitting the at least one second request, by the first network entity, responsive to an expiration of the timer.

This provides the advantage that by starting the timer a network failure can be detected in which case no reply to the first request is received and countermeasures can be taken.

In an implementation form, the method comprises: transmitting at least one acknowledgement, by the first network entity, directed to the second network entity via the at least one second network path/flow responsive to a reception of a reply to the at least one second request from the second network entity; and configuring, by the second network entity, the at least one second network path/flow of the at least two different network paths/flows via which the respective acknowledgement from the first network entity is first received by the second network entity, as primary network path/flow.

This provides the advantage that a primary network path/flow can be established even if the first request is lost.

In an implementation form, the method comprises: transmitting a further first request, by the first network entity, directed to the second network entity via a first network path/flow responsive to the reception of the acknowledgement to the at least one second request from the second network entity, wherein the further first request comprises information indicating the first network path/flow to be configured as secondary network path/flow.

This provides the advantage that one or more secondary network paths/flows can be established even if the first request is lost. These secondary network paths/flows can be used as redundant network paths/flows or aggregate network paths/flows.

According to a second aspect, the invention relates to a first network entity for establishing a communication connection to a second network entity, in particular to a second network entity according to the third aspect below, via at least two different network paths/flows, the first network entity comprising: at least one network interface configured to transmit a first request via a first network path/flow and at least one second request via at least one second network path/flow directed to the second network entity and configured to receive a reply to the first request from the second network entity; and a processor configured to control the at least one network interface to transmit the at least one second request before receiving the reply to the first request from the second network entity and configured to establish the communication connection to the second network entity based on at least one of the first request or the at least one second request.

Such a first network entity provides the advantage that transmitting the one or more second requests can be performed without waiting for a reply to the first request. Thus, in case that the first request gets lost or a failure with respect to the first request occurs, the first network entity can transmit one or more second requests which cause the second network entity to send replies. Hence, communication establishment between first and second network entities can be guaranteed even in such scenarios where the first request is not replied. This guarantees a safe connection establishment over at least one network path/flow of a plurality of available network paths/flows.

According to a third aspect, the invention relates to a second network entity for establishing a communication connection to a first network entity, in particular to a first network entity according to the second aspect above, via at least two different network paths/flows, the second network entity comprising: at least one network interface configured to receive a first request via a first network path/flow and at least one second request via at least one second network path/flow from the first network entity and configured to transmit a reply to the first request and at least one reply to the at least one second request directed to the first network entity; and a processor configured to control the at least one network interface to transmit the reply to the first request responsive to receiving the first request and to transmit the at least one reply to the at least one second request responsive to receiving the at least one second request and configured to establish the communication connection to the first network entity based on at least one of the first request or the at least one second request.

Such a second network entity provides the advantage that one or more second requests can be received even if no reply to the first request is sent, e.g. if no first request is received by the second network entity. Thus, in case that the first request gets lost or a failure with respect to the first request occurs, the second network entity can receive one or more second requests and thus send replies to these second requests even if no first request is received. Hence, communication establishment between first and second network entities can be guaranteed even in such scenarios where the first request is not received by the second network entity. This guarantees a safe connection establishment over at least one network path/flow of a plurality of available network paths/flows.

According to a fourth aspect, the invention relates to a communication system for initiating a communication between a first network entity and a second network entity via at least two different network paths/flows, the communication system comprising: a first network entity according to the second aspect; and a second network entity according to the third aspect.

Such a communication system guarantees a robust and safe connection establishment over at least one network path/flow.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 4 shows a message sequence diagram illustrating a method 400 for establishing a communication connection between a first network entity 310, e.g. a host computer Host A, and a second network entity 320, e.g. a host computer Host B, via at least two different network paths/flows 313, 314 according to a first implementation form. In FIG. 4, the first network entity 310 has an exemplary number of two network interfaces 311, 312 and the second network entity 320 has an exemplary number of one network interfaces 321. It is understood that the invention can be applied with any other numbers of network interfaces for both, the first network entity 310 and the second network entity 320.

The method 400 includes: transmitting a first request 401, by the first network entity 310, directed to the second network entity 320 via a first network path/flow 313; transmitting at least one second request 402, by the first network entity 310, directed to the second network entity 320 via at least one second network path/flow 314, wherein the at least one second request 402 is transmitted by the first network entity 310 before the first network entity 310 receives a reply 403 to the first request 401 from the second network entity 320; and establishing the communication connection between the first network entity 310 and the second network entity 320 based on at least one of the first request 401 or the at least one second request 402.

The first request 401 may be a SYN message according to MPTCP or TCP protocol standard that may include a MP_CAPABLE section with key information "KeyA". The second request 402 may also be a SYN message according to MPTCP or TCP protocol standard that may include a MP_CAPABLE section with first key information "KeyA". The reply 403 to the first request 401 may be a SYN/ACK message according to MPTCP or TCP protocol standard that may include a MP_CAPABLE section with second key information "KeyB". The reply 404 to the second request 402 may also be a SYN/ACK message according to MPTCP or TCP protocol standard that may include a MP_CAPABLE section with second key information "KeyB".

The method 400 may further include: transmitting the first request 401 comprising information (MP_CAPABLE, KeyA) indicating the first network path/flow 313 to be configured as primary network path/flow; and transmitting the at least one second request 402 comprising information (MP_CAPABLE, KeyA) indicating the at least one second network path/flow 314 also to be configured as primary network path/flow.

The at least two different network paths/flows 313, 314 may be configured to couple the first network entity 310 with the second network entity 320 via a multipoint-to-point connection, a multipoint-to-multipoint connection or a point-to-multipoint connection. A multipoint-to-point connection is shown in FIG. 4. For the multipoint-to-point connection, the first network entity 310 should have at least two network interfaces and the second network entity 320 should have at least one network interface. For the multipoint-to-multipoint connection, both network entities 310, 320 should each have at least two network interfaces. For the point-to-multipoint connection, the first network entity 310 should have at least one network interface and the second network entity 320 should have at least two network interfaces.

In the method 400, transmitting the first request 401 may be initiated approximately at the same time as transmitting the at least one second request 402.

The method 400 may further include: enabling data communication, by the first network entity 310, responsive to a decision based on the reception of the reply 403 to the first request 401 from the second network entity 320 and/or a reception of at least one reply 404 to the at least one second request 402 from the second network entity (Host B) 320; transmitting a first acknowledgement 405, by the first network entity 310, directed to the second network entity 320 via the first network path/flow 313; transmitting at least one second acknowledgement 406, by the first network entity 310, directed to the second network entity 320 via the at least one second network path/flow 314; and configuring, by the second network entity 320, the network path/flow of the at least two different network paths/flows via which the respective acknowledgement from the first network entity 310 is first received by the second network entity 320, as primary network path/flow. The above described decision may be to use the first received reply, i.e. reply 403 or reply 404 to enable data communication or to put connection in established mode, respectively.

The first acknowledgement 405 may be an ACK message according to MPTCP or TCP protocol standard that may include a MP_CAPABLE section with first key information "KeyA" and second key information "KeyB". The second acknowledgement 406 may also be an ACK message according to MPTCP or TCP protocol standard that may include a MP_CAPABLE section with first key information "KeyA" and second key information "Key B".

The method 400 may further include: configuring, by the second network entity 320, the at least one other network path/flow of the at least two different network paths/flows via which the respective acknowledgement 405, 406 from the first network entity 310 is received thereafter by the second network entity 320, as at least one secondary network path/flow 412.

The method 400 may further include: configuring the primary network path/flow 411 as initial flow according to the multipath transport control protocol (MPTCP); and configuring the at least one secondary network path/flow 412 as subsequent flow according to the MPTCP protocol.

The method 400 implements a first approach also referred to as the "concurrent connection establishment attempt approach" which exploits multipath connectivity as shown in FIG. 4. Among the different viable solutions as presented in this disclosure, the preferred solution is this first approach as shown in FIG. 4 due to the following reasons.

Host A 310 sends SYN requests 401, 402 with same MP_CAPABLE options from both of its interfaces, Int1$_A$ 311 and Int2$_A$ 312, at the same (or approximately the same) time. The challenge in this approach is how to react in cases where each attempt succeeds. This is solved in FIG. 4 by choosing one of the connections as initial subflow and downgrade the rest as subsequent subflows, the case of "first come first serve" as shown in FIG. 4. This includes finding ways for: key exchange mechanisms, token generation, Data Sequence Signal generation, and forcing the network layer to attempt connection on all of its available interfaces/paths rather than just on the default route. Be aware, that each 3-way handshake can break at different stages. Furthermore be aware, that "first come first serve" can lead to a situation where primary socket differs at the endpoint. Remember standard MPTCP by RFC 6824 first establishes a primary connection which is belonging to the same endpoints on both sides as illustrated in FIG. 3. Now with solution of FIG. 4, it might be that on Host A 310 the endpoints Int1$_A$↔Int1$_B$ 311, 321 are identified as primary and on Host B Int1$_B$↔Int2$_A$ 312, 321. An important additional feature beside robustness is a faster setup of subsequent flows. Standard MPTCP starts subsequent flow establishment after the process of building a primary connection. That adds an artificial delay until the full benefit of aggregating path/flow can be exploited. Now, flows establishment, whether they will be primary or subsequent, starts at the same time and thereby are available earlier. Primary or subsequent decision is made afterwards.

Figure 5:
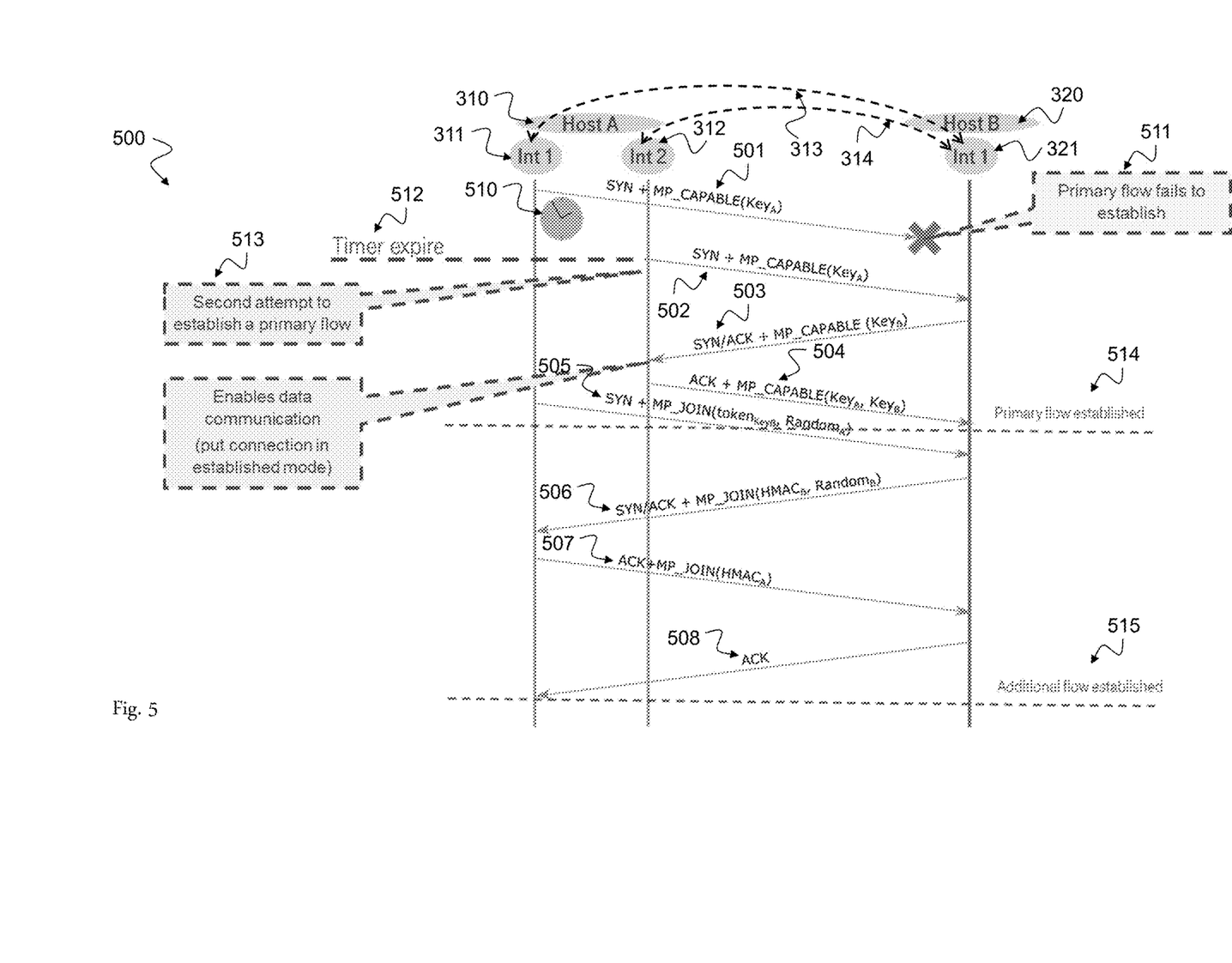
FIG. 5 shows a message sequence diagram illustrating a method 500 for establishing a communication connection between a first network entity and a second network entity via two different network paths/flows according to a second implementation form.

FIG. 5 shows a message sequence diagram illustrating a method 500 for establishing a communication connection between a first network entity, e.g. a host computer Host A, and a second network entity 320, e.g. a host computer Host B, via at least two different network paths/flows 313, 314 according to a second implementation form.

The method 500 includes: transmitting a first request 501, by the first network entity 310, directed to the second network entity 320 via a first network path/flow 313; transmitting at least one second request 502, by the first network entity 310, directed to the second network entity 320 via at least one second network path/flow 314, wherein the at least one second request 502 is transmitted by the first network entity 310 before the first network entity 310 receives a reply to the first request 501 from the second network entity 320; and establishing the communication connection between the first network entity 310 and the second network entity 320 based on at least one of the first request 501 or the at least one second request 502.

In the scenario depicted in FIG. 5, a distortion happens so that no reply to the first request 501 is transmitted by the second network entity 320 to the first network entity 310. However, this does not change the situation that the one or more second requests 502 are transmitted to the second network entity 320 prior to reception of an actually or intended reply sent by the second network entity 320 towards the first network entity 310.

The first request 501 may be a SYN message according to MPTCP or TCP protocol standard that may include a MP_CAPABLE section with key information "KeyA". The second request 502 may also be a SYN message according to MPTCP or TCP protocol standard that may include a MP_CAPABLE section with first key information "KeyA".

The method 500 may further include: transmitting the first request 501 comprising information (MP_CAPABLE, KeyA) indicating the first network path/flow 313 to be configured as primary network path/flow; and transmitting the at least one second request 502 comprising information (MP_CAPABLE, KeyA) indicating the at least one second network path/flow 314 also to be configured as primary network path/flow.

The at least two different network paths/flows 313, 314 may be configured to couple the first network entity 310 with the second network entity 320 via a multipoint-to-point connection, a multipoint-to-multipoint connection or a point-to-multipoint connection in the same way as described above with respect to FIG. 4.

The method 500 may further include: starting 510 a timer, by the first network entity 310, responsive to transmitting the first request 501; and transmitting the at least one second request 502, by the first network entity 310, responsive to an expiration 512 of the timer.

The method 500 may further include: transmitting at least one acknowledgement 504, by the first network entity 310, directed to the second network entity 320 via the at least one second network path/flow 314 responsive to a reception of a reply 503 to the at least one second request 502 from the second network entity 320; and configuring, by the second network entity 320, the at least one second network path/flow 314 of the at least two different network paths/flows via which the respective acknowledgement 504 from the first network entity 310 is first received by the second network entity 320, as primary network path/flow 514.

The reply 503 to the second request 502 may be a SYN/ACK message according to MPTCP or TCP protocol standard that may include a MP_CAPABLE section with second key information "Key$_B$". The acknowledgement 504 may be an ACK message according to MPTCP or TCP protocol standard that may include a MP_CAPABLE section with first key information "Key$_A$" and second key information "Key$_B$".

The method 500 may further include: transmitting a further first request 505, by the first network entity 310, directed to the second network entity 320 via a first network path/flow 313 responsive to the reception of the acknowledgement 503 to the at least one second request 502 from the second network entity 320, wherein the further first request 505 comprises information (MP_JOIN, token$_{KeyB}$, Random$_A$) indicating the first network path/flow 313 to be configured as secondary network path/flow 515.

The further first request 505 may be a SYN message according to MPTCP or TCP protocol standard that may include a MP_JOIN section with token key information "token$_{KeyB}$" and random information "Random$_A$". A reply 506 to the further first request 505 may be a SYN/ACK message according to MPTCP or TCP protocol standard that may include a MP_JOIN section with the following information: HMAC$_B$, 64 bit, Random$_B$. An ACK 507 sent in response to receiving the reply 506 may be an ACK message according to MPTCP or TCP protocol standard that may include a MP_JOIN section with the following information: HMAC$_A$, 160 bit. The second network entity 320 may send an ACK 508 in response to receiving the ACK message 507.

The method 500 implements a second approach also referred to as the "timer approach" which builds a timer inside the MPTCP connection establishment process and sends subsequent connection requests on other available interfaces, should former attempts fail within a predefined time frame. This second approach is a more simplified option, which guarantees full backward compatibility to standard MPTCP.

Although a seemingly trivial approach, this second approach according to FIG. 5 also requires the MPTCP stack to force the network layer to establish connection to the far end on its non-default routes. From the user experience point of view, this approach would even have far reaching consequences. The timer value would be a deciding factor, how long should one wait before deciding the desired destination is not reachable via the route in question. Since all internet connections have a very dynamic latency, it is almost not possible to have a universally functioning value that can be set on all implementations. As shown in FIG. 5, once a primary flow is established successfully, it is possible to try initiate subsequent flows through remaining available interfaces/paths, compliant to standard MPTCP.

A third approach is described in the following. One may wonder why not just develop applications/scripts that run in the background and make sure that there is always a working default route. This, however, is not a universally possible solution, especially for mobile devices that do not give access to their internal functionalities (such as iOS devices). Running such scripts, for those devices with access to their routing modules, is also not an optimal solution due to its costs. Processes consume resources, energy being the most critical of all on mobile devices and memory for light weight network devices. Moreover, even such background processes cannot deliver an instantaneous result, as they would have to figure out the connection status first before doing any routing entry changes. Hence, it is by virtue to say, background process cannot be a universally acceptable and optimal solution for this challenge.

A fourth and even more simplified and less resource consuming option is to make use of the tunneling functionality. HA makes use of tunnels to force data streams follow only the route via the HA Server, that is, the HA Server acts as the internet gateway for the clients siting behind a Home Gateway. Currently this tunneling uses the OpenVPN application which has a keep alive functionality for each established tunnel. Accordingly, it is possible to have a routing rule that checks the existence of a tunnel used as a default gateway and reacts immediately after the tunnel registers change of status. This way it is possible to keep an always available default route ready for any connection request. The drawback for this approach is that this kind of solution is bound only to similar implementations. Furthermore, the tunnel keep alive interval determines the efficiency of this approach, the more frequent the keep alive messages the more resource (both processing power and network throughput) consumption by the tunneling application.

Figure 6:
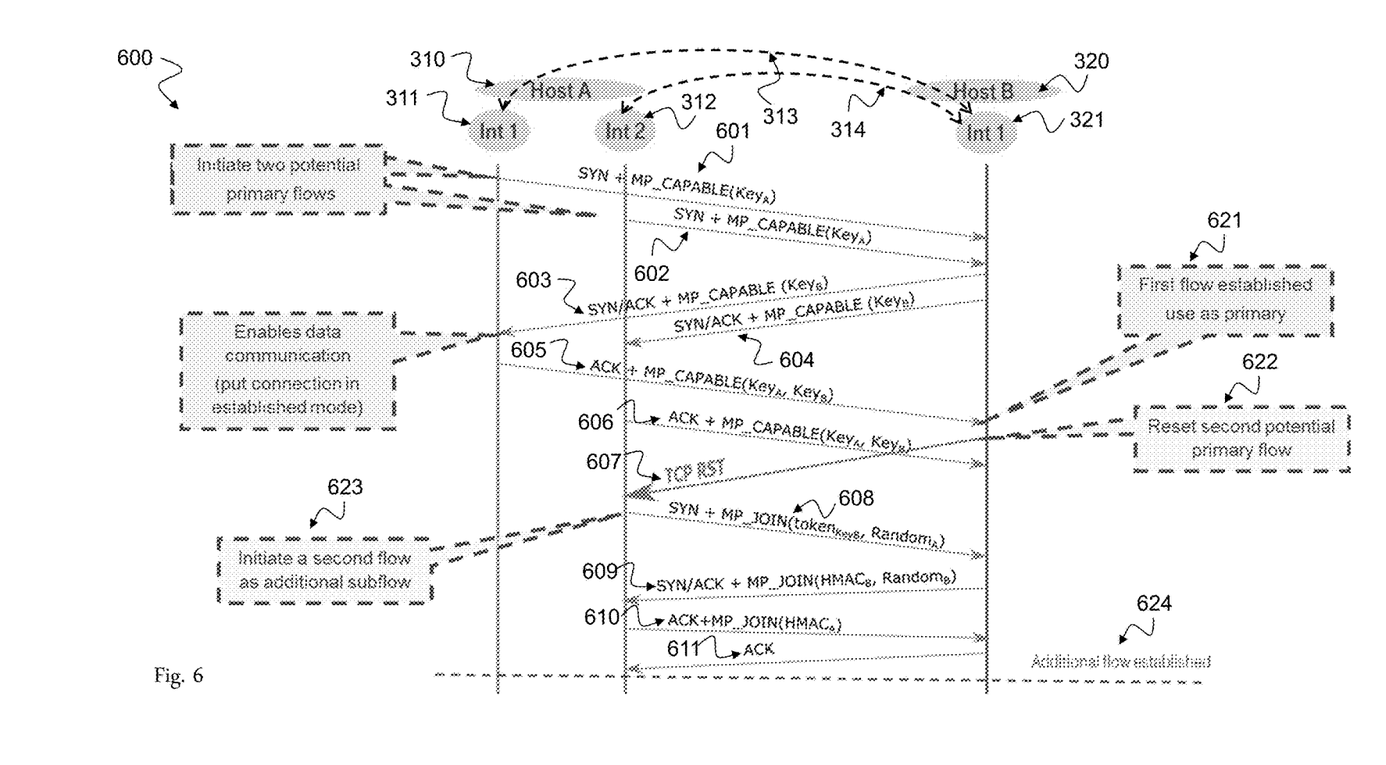
FIG. 6 shows a message sequence diagram illustrating a method 600 for establishing a communication connection between a first network entity and a second network entity via two different network paths/flows according to a third implementation form.

FIG. 6 shows a message sequence diagram illustrating a method 600 for establishing a communication connection between a first network entity, e.g. a host computer Host A, and a second network entity 320, e.g. a host computer Host B, via at least two different network paths/flows 313, 314 according to a third implementation form.

The method 600 includes: transmitting a first request 601, by the first network entity 310, directed to the second network entity 320 via a first network path/flow 313; transmitting at least one second request 602, by the first network entity 310, directed to the second network entity 320 via at least one second network path/flow 314, wherein the at least one second request 602 is transmitted by the first network entity 310 before the first network entity 310 receives a reply 603 to the first request 601 from the second network entity 320; and establishing the communication connection between the first network entity 310 and the second network entity 320 based on at least one of the first request 601 or the at least one second request 602.

The first request 601 may be a SYN message according to MPTCP or TCP protocol standard that may include a MP_CAPABLE section with key information "Key$_A$". The second request 602 may also be a SYN message according to MPTCP or TCP protocol standard that may include a MP_CAPABLE section with first key information "Key$_A$". The reply 603 to the first request 601 may be a SYN/ACK message according to MPTCP or TCP protocol standard that may include a MP_CAPABLE section with second key information "Key$_B$". The reply 604 to the second request 602 may also be a SYN/ACK message according to MPTCP or TCP protocol standard that may include a MP_CAPABLE section with second key information "Key$_B$".

The method 600 may further include: transmitting the first request 601 comprising information (MP_CAPABLE, KeyA) indicating the first network path/flow to be configured as primary network path/flow; and transmitting the at least one second request 602 comprising information (MP_CAPABLE, KeyA) indicating the at least one second network path/flow also to be configured as primary network path/flow.

The at least two different network paths/flows may be configured to couple the first network entity 310 with the second network entity 320 via a multipoint-to-point connection, a multipoint-to-multipoint connection or a point-to-multipoint connection as described above with respect to FIG. 4.

Transmitting the first request 601 may be initiated approximately at the same time as transmitting the at least one second request 602, e.g. according to the description with respect to FIG. 4.

The method 600 may further include: enabling data communication, by the first network entity 310, responsive to a decision based on the reception of the reply 603 to the first request 601 from the second network entity 320 and/or a reception of at least one reply 604 to the at least one second request 602 from the second network entity 320; transmitting a first acknowledgement 605, by the first network entity 310, directed to the second network entity 320 via the first network path/flow 313; transmitting at least one second acknowledgement 606, by the first network entity 310, directed to the second network entity 320 via the at least one second network path/flow 314; and configuring, by the second network entity 320, the network path/flow of the at least two different network paths/flows via which the respective acknowledgement 605, 606 from the first network entity 310 is first received by the second network entity 320, as primary network path/flow 621. The above described decision may be to use the first received reply, i.e. reply 603 or reply 604 to enable data communication or to put connection in established mode, respectively.

The first acknowledgement 605 may be an ACK message according to MPTCP or TCP protocol standard that may include a MP_CAPABLE section with first key information "$Key_A$" and second key information "$Key_B$". The second acknowledgement 606 may also be an ACK message according to MPTCP or TCP protocol standard that may include a MP_CAPABLE section with first key information "$Key_A$" and second key information "$Key_B$".

The method 600 may further include: transmitting at least one network path/flow reset signal 607, by the second network entity 320, directed to the first network entity 310 via the at least one other network path/flow 314 of the at least two different network paths/flows responsive to the respective acknowledgement 605, 606 received at first.

The method 600 may further include: transmitting at least one further second request 608, by the first network entity 310, directed to the second network entity 320 via the at least one other network path/flow 314 responsive to a reception of the at least one network path/flow reset signal 607, by the first network entity 310.

The method 600 may further include: transmitting the at least one further second request 608 comprising information (MP_JOIN, $Token_{KeyB}$, $Random_A$) indicating the at least one other network path/flow 314 to be configured as at least one secondary network path/flow 623, 624.

The further second request 608 may be a SYN message according to MPTCP or TCP protocol standard that may include a MP_JOIN section with token key information "$Token_{KeyB}$" and random information "$Random_A$". A reply 609 to the further second request 608 may be a SYN/ACK message according to MPTCP or TCP protocol standard that may include a MP_JOIN section with the following information: $HMAC_B$, $Random_B$. An ACK 610 sent in response to receiving the reply 609 may be an ACK message according to MPTCP or TCP protocol standard that may include a MP_JOIN section with the following information: $HMAC_A$. The second network entity 320 may send an ACK 611 in response to receiving the ACK message 610.

The method 600 implements a fifth approach also referred to as the "break before make" way that simplifies one of the challenges of the MPTCP RobE approach (described above with respect to FIG. 4). As soon as one subflow is fully established 621, the receiver side sends a TCP RST message 607 on any other subsequent flows attempting to establish a primary flow, killing them no matter at which establishment state they are. Then after the regular MP_JOIN messages can be used to establish subsequent subflows and join the primary flow as described in the following. This approach inherits most of the challenges from MPTCP RobE, but with a reduced level of complication.

Among these five options described above with respect to FIGS. 4 to 6, despite being the most complicated approach, only the first method 400 promises the most likely robust and universally acceptable solution. The fifth approach (method 600), though presenting a simplified version of MPTCP RobE approach, imposes unnecessary connection reestablishments that would limit the possibility to use already established sessions for data transmission or in the worst case even lead to bad user experience. The MPTCP RobE approach as shown in FIG. 4 will not require any kind of intervention from system administrators to make use of, nor would it add any significant weight onto the resource utilization. The underlying assumption of this approach is that, it allows the formation of multiple primary flows for a single connection and then downgrades all but one to a subsequent flow status after some conditions are met. The criteria for selecting the primary flow may be the time taken to establish the connection fully, that is, the fastest will be declared as primary flow.

Challenges for the MPTCP RobE approach according to FIG. 4 may be as described in the following:

1) Subflow identification can no longer be possible with the use of token, each connection establishment attempt will trigger its own random number generation that results in different token values that cannot help to identify a connection. Thus, 5-tuple should be used to identify among the subflows but there should be some kind of connection ID to group those belonging to a single connection together.

2) Allowing multiple connection requests to be acceptable entails a higher security risk, as it opens the door for intruders to join any flow with a normal SYN request. One should choose a reasonably short time interval for such openings or some sort of authentication should be in place.

3) Each primary flow establishment brings with it a different Data Sequence Numbering (DSN), which is used to maintain a higher level segment ordering. Without DSN, it could not be possible to have a reliable and sequential data delivery. Harmonizing the choice of DSN among flows belonging to the same connection may also be necessary.

4) If there is a 5-tuple mismatch in the primary flow, connection establishment from the applications point of view starts by creating a socket which is defined by a 5-tuple. By design this 5-tuple is same as the one that identify a primary flow. If a client initiates a connection with its interface 1 as primary flow, but the server receives its connection request initiated from the interface 2 first, the server will have primary socket on the same flow attributes. This way the client and server will have application layer sockets with different 5-tuple. This needs to be handled carefully.

5) Invalidation of the cheapest-pipe-first principle for the first few seconds, shall the non-prioritized path/flow manage to establish the first connection. Such a problem could have great consequences for short lived connections, in such cases there is high possibility that the complete needs of the application initiating the connection be served by the non-prioritized path/flow only. Considering the fact that today's typical web contents involve requests to more than 30 domains, one can feel the effect of this drawback on regular client networks. Moreover, given the share of HTTP traffic to be more than half of all internet communications, this presents a higher challenge if not properly addressed.

The advantages of MPTCP RobE approach (shown in FIG. 4) are not limited to delivering a robust connection establishment for MPTCP. It will have a far reaching impact on user experience. This increases the total throughput delivered to the application layer as compared to regular MPTCP (shown in FIG. 3), where it can use only one flow until subsequent subflows are established. For short lived sessions, the application layer delivered throughput is limited by the slow start phase of TCP, which takes multiple RTTs to increase to a level that utilizes the maximum line capacity. However, having multiple flows from the beginning implies very few RTTs are required to fetch the data in question.

For clients that use a slower (higher latency) link as their default gateway, the MPTCP RobE solution according to FIG. 4 makes sure that they are guaranteed to have the fastest of all the available links as their primary flow, thereby improving their user experience.

Figure 7:
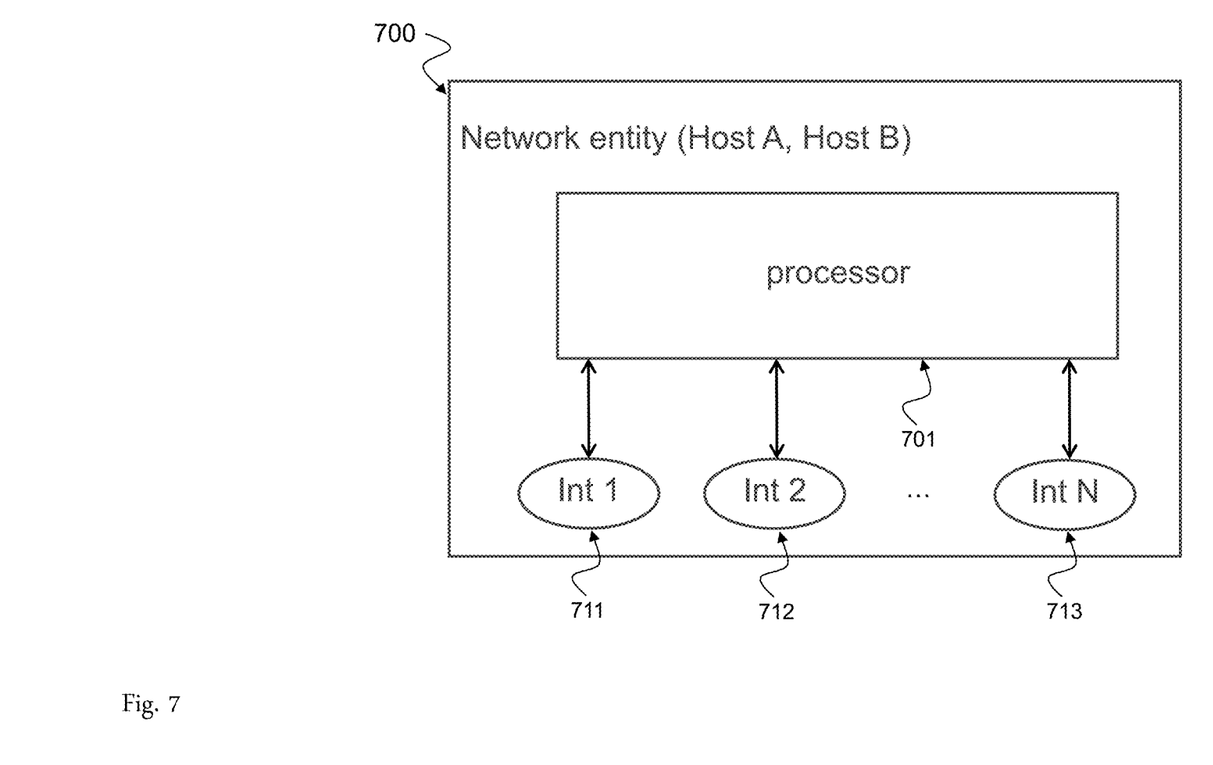
FIG. 7 shows a schematic diagram illustrating a network entity 700 for establishing a communication connection to another network entity via two different network paths/flows according to an implementation form.

FIG. 7 shows a schematic diagram illustrating a network entity 700 for establishing a communication connection to another network entity via at least two different network paths/flows according to an implementation form.

The network entity 700 may be a first network entity 310 as described above with respect to FIGS. 3 to 6 or a second network entity 320 as described above with respect to these figures. Each of these networks entities 310, 320 may initiate the connection establishment procedure to the other network entity 320, 310 by using the methods 400, 500, 600 as described above with respect to FIGS. 4 to 6.

Such a first network entity 700, 310 includes at least one network interface 711, 712, 713, e.g. a network interface 311, 312 as described with respect to FIGS. 3 to 6, and a processor 701 that may implement one or all of the methods 400, 500, 600 as described above with respect to FIGS. 4 to 6.

The at least one network interface 711, 712, 713 is configured to transmit a first request, e.g. a first request 401, 501, 601 as described above with respect to FIGS. 4 to 6, via a first network path/flow 313 and at least one second request, e.g. at least one second request 402, 502, 602 as described above with respect to FIGS. 4 to 6, via at least one second network path/flow 314 directed to the second network entity 320 and configured to receive a reply, e.g. a reply 403, 603 as described above with respect to FIGS. 4 and 6, to the first request 401, 501, 601 from the second network entity 320.

The processor 701 is configured to control the at least one network interface 711, 712, 713 to transmit the at least one second request 402, 502, 602 before receiving the reply 403, 603 to the first request 401, 501, 601 from the second network entity 320 and configured to establish the communication connection to the second network entity 320 based on at least one of the first request 401, 501, 601 or the at least one second request 402, 502, 602.

Such a second network entity 700, 320 includes at least one network interface 711, 712, 713, e.g. a network interface 321 as described with respect to FIGS. 3 to 6, and a processor 701 that may implement one or all of the methods 400, 500, 600 as described above with respect to FIGS. 4 to 6.

The at least one network interface 711, 712, 713 is configured to receive a first request, e.g. a first request 401, 501, 601 as described above with respect to FIGS. 4 to 6, via a first network path/flow 313 and at least one second request, e.g. at least one second request 402, 502, 602 as described above with respect to FIGS. 4 to 6, via at least one second network path/flow 314 from the first network entity 310 and configured to transmit a reply, e.g. a reply 403, 603 as described above with respect to FIGS. 4 and 6, to the first request 401, 501, 601 and at least one reply, e.g. at least one reply 404, 503, 604 as described above with respect to FIGS. 4 to 6, to the at least one second request 402, 502, 602 directed to the first network entity 310.

The processor 701 is configured to control the at least one network interface 321, 711, 712, 713 to transmit the reply 403, 603 to the first request 401, 501, 601 responsive to receiving the first request 401, 501, 601 and to transmit the at least one reply 404, 503, 604 to the at least one second request 402, 502, 602 responsive to receiving the at least one second request 402, 502, 602 and configured to establish the communication connection to the first network entity 310 based on at least one of the first request 401, 501, 601 or the at least one second request 402, 502, 602.

The methods, systems and devices described herein may be implemented as electrical and/or optical circuit within a chip or an integrated circuit or an application specific integrated circuit (ASIC). The invention can be implemented in digital and/or analogue electronic and optical circuitry.

The methods, systems and devices described herein may be implemented as software in a Digital Signal Processor (DSP), in a micro-controller or in any other side-processor or as hardware circuit within an application specific integrated circuit (ASIC) of a Digital Signal Processor (DSP).

The invention can be implemented in digital electronic circuitry, or in computer hardware, firmware, software, or in combinations thereof, e.g. in available hardware of conventional optical transceiver devices or in new hardware dedicated for processing the methods described herein.

The present disclosure also supports a computer program product including computer executable code or computer executable instructions that, when executed, causes at least one computer to execute the performing and computing steps described herein, in particular the methods 400, 500 and 600 as described above with respect to FIGS. 4 to 6 and the techniques described above with respect to FIGS. 1 to 3. Such a computer program product may include a readable non-transitory storage medium storing program code thereon for use by a computer. The program code may perform the methods 400, 500 and 600 as described above with respect to FIGS. 4 to 6.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishing a communication connection between a first network entity and a second network entity via at least two different network flows, the method comprising:
    transmitting a first request, by the first network entity, directed to the second network entity via a first network flow;
    transmitting at least one second request, by the first network entity, directed to the second network entity via at least one second network flow, wherein the at least one second request is transmitted by the first network entity before the first network entity receives a reply to the first request from the second network entity; and
    establishing the communication connection between the first network entity and the second network entity based on at least one of the first request or the at least one second request;
    wherein the method further comprises:
    enabling data communication, by the first network entity, responsive to a decision based on reception of the reply to the first request from the second network entity and/or reception of at least one reply to the at least one second request from the second network entity;
    transmitting a first acknowledgement, by the first network entity, directed to the second network entity via the first network flow;
    transmitting at least one second acknowledgement, by the first network entity, directed to the second network entity via the at least one second network flow; and
    configuring, by the second network entity, a respective network flow of the first network flow and the at least one second network flow via which a respective acknowledgement of the first acknowledgement and the at least one second acknowledgement is first received by the second network entity as a primary network flow.

2. The method of claim 1, wherein the first request comprises information (MP_CAPABLE, $Key_A$) indicating that the first network flow is to be configured as a primary network flow; and
    wherein the at least one second request comprises information (MP_CAPABLE, $Key_A$) indicating that the at least one second network flow is to be configured as a primary network flow.

3. The method of claim 1, wherein the at least two different network flows are configured to couple the first network entity with the second network entity via a multipoint-to-point connection, a multipoint-to-multipoint connection, or a point-to-multipoint connection.

4. The method of claim 1, wherein transmitting the first request is initiated at the same time as transmitting the at least one second request.

5. The method of claim 1, further comprising:
    configuring, by the second network entity, at least one network flow of the at least two different network flows other than the primary network flow as at least one secondary network flow, wherein at least one acknowledgement corresponding to the at least one other network flow is received after the respective acknowledgement corresponding to the primary network flow.

6. The method of claim 5, wherein the primary network flow is configured as a primary flow according to the multipath transport control protocol (MPTCP); and
    wherein the at least one secondary network flow is configured as at least one subsequent flow according to the MPTCP protocol.

7. The method of claim 1, further comprising:
    transmitting at least one network flow reset signal, by the second network entity, directed to the first network entity via at least one network flow of the at least two different network flows other than the primary network flow, wherein transmitting the at least one network flow reset signal is responsive to the respective acknowledgement corresponding to the primary network flow.

8. The method of claim 7, further comprising:
    transmitting at least one further second request, by the first network entity, directed to the second network entity via the at least one other network flow, wherein transmitting the at least one further second request is responsive to reception of the at least one network flow reset signal, by the first network entity.

9. The method of claim 8, wherein the at least one further second request comprises information (MP_JOIN, $Token_{KeyB}$, $Random_A$) indicating that the at least one other network flow is to be configured as at least one secondary network flow.

10. The method of claim 1, further comprising:
    starting a timer, by the first network entity, responsive to transmitting the first request; and
    transmitting the at least one second request, by the first network entity, responsive to expiration of the timer.

11. The method of claim 10, wherein the respective network flow configured as the primary network flow is a network flow of the at least one second network flow.

12. The method of claim 11, further comprising:
    transmitting a further first request, by the first network entity, directed to the second network entity via the first network flow, wherein the further first request comprises information (MP_JOIN, $Token_{KeyB}$, $Random_A$)

indicating that the first network flow is to be configured as a secondary network flow.

13. A first network entity for establishing a communication connection to a second network entity via at least two different network flows, the first network entity comprising:
at least one network interface configured to:
transmit a first request to the second network entity via a first network flow;
transmit at least one second request to the second network entity via at least one second network flow;
receive a reply to the first request from the second network entity; and
a processor configured to:
control the at least one network interface to transmit the at least one second request before receiving the reply to the first request from the second network entity; and
establish the communication connection to the second network entity based on at least one of the first request or the at least one second request;
wherein the first request comprises a SYN message according to the Multipath Transport Control Protocol (MTCP) standard; and
wherein the at least one second request comprises at least one SYN message according to the MTCP standard.

14. A second network entity for establishing a communication connection to a first network entity via at least two different network flows, the second network entity comprising:
at least one network interface configured to:
receive a first request from the first network entity via a first network flow;
receive at least one second request from the first network entity via at least one second network flow;
transmit to the first network entity a reply to the first request; and
transmit to the first network entity at least one reply to the at least one second request; and
a processor configured to:
control the at least one network interface to transmit the reply to the first request responsive to receiving the first request and to transmit the at least one reply to the at least one second request responsive to receiving the at least one second request; and
establish the communication connection to the first network entity based on at least one of the first request or the at least one second request;
wherein the first request comprises a SYN message according to the Multipath Transport Control Protocol (MTCP) standard; and
wherein the at least one second request comprises at least one SYN message according to the MTCP standard.

* * * * *